UNITED STATES PATENT OFFICE.

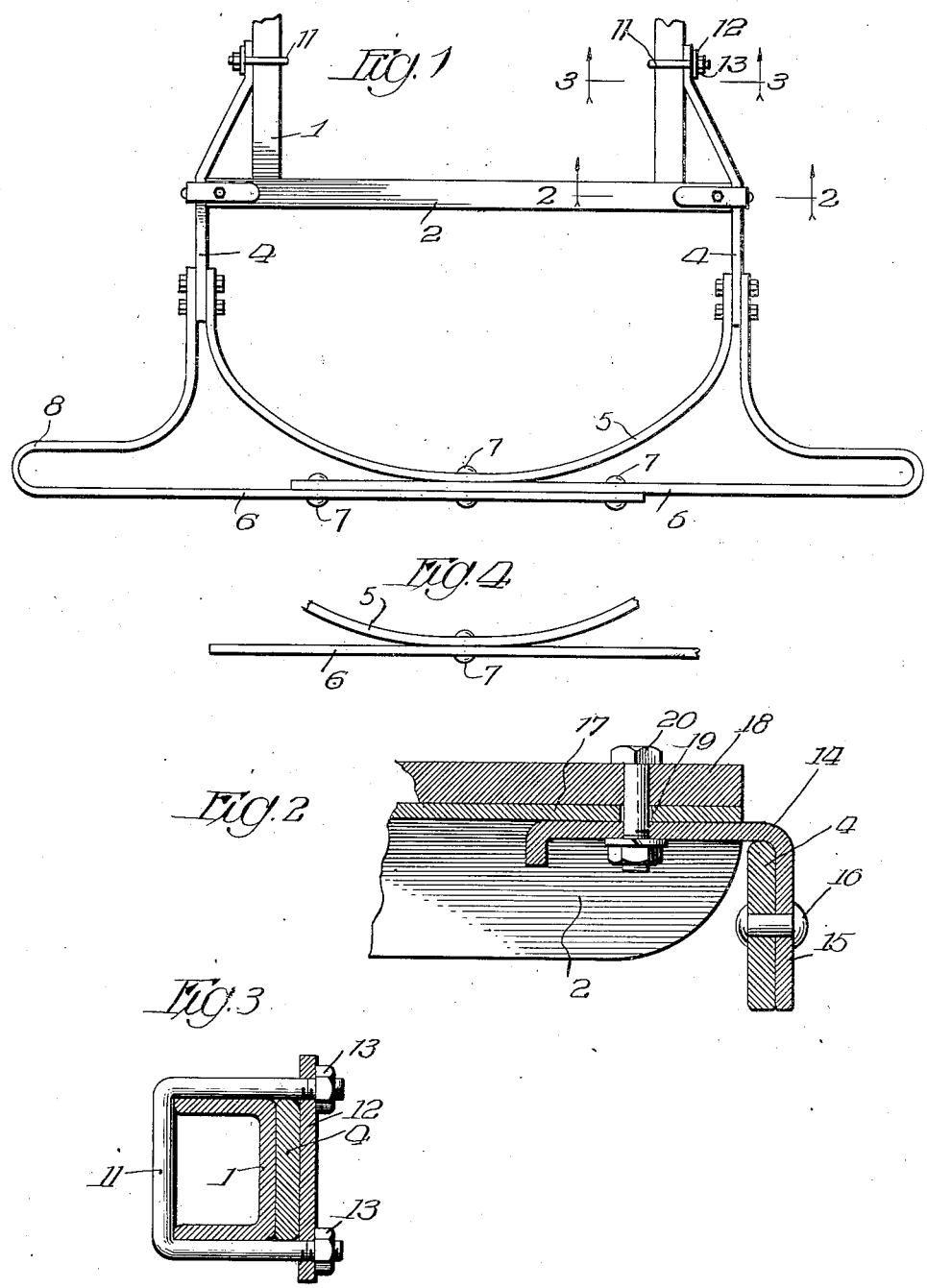

CHARLES H. HATHAWAY, OF WEST ALLIS, AND WILLIAM A. STARCK, OF MILWAUKEE, WISCONSIN, ASSIGNORS TO BADGER MANUFACTURING CORPORATION, OF MILWAUKEE, WISCONSIN, A CORPORATION OF DELAWARE.

AUTOMOBILE BUMPER.

1,404,607.  Specification of Letters Patent.  Patented Jan. 24, 1922.

Application filed August 23, 1921. Serial No. 494,648.

*To all whom it may concern:*

Be it known that we, CHARLES H. HATHAWAY and WILLIAM A. STARCK, citizens of the United States, residing, respectively, at West Allis, in the county of Milwaukee and State of Wisconsin, and Milwaukee, in the county of Milwaukee and State of Wisconsin, have invented new and useful Improvements in Automobile Bumpers, of which the following is a specification.

This invention relates to an automobile bumper.

This bumper is particularly applicable for attachment to the rear of an automobile whose frame has a transverse end bar.

An object of invention is to provide an automobile bumper which may be easily and quickly attached to an automobile frame and rigidly fastened thereto without weakening or mutilating the frame.

Other objects and advantages will hereinafter appear.

The bumper is illustrated as applied to the rear of the frame of a Ford automobile, although it may be applied to the frames of other automobiles.

The views of the drawings are:

Fig. 1 shows an automobile bumper, the impact bar of which is made in two sections, and which is mounted on the rear of an automobile frame.

Fig. 2 is a transverse vertical section on line 2—2 of Fig. 1.

Fig. 3 is a transverse vertical section on line 3—3 of Fig. 1.

Fig. 4 is a top plan of a portion of a one-piece bumper impact bar.

Figs. 1, 2 and 3 will be first described.

Fig. 1 shows the rear of the frame of a Ford automobile on which the bumper is mounted.

This frame comprises longitudinal side bars 1 and a transverse end bar, whose ends project beyond the side bars.

The bumper comprises an impact bar 3, longitudinal supporting brackets 4 and an auxiliary or reenforcing bar 5 which are made of resilient bar material so that the bumper is horizontally yieldable, but substantially rigid or nonyieldable in a vertical direction.

The transverse impact bar 3 is made in two similarly shaped sections 6, having overlapped ends rigidly fastened together by means of rivets 7 or other fastening means.

Each section 6 has an integrally looped end 8 and a longitudinally disposed arm 9 arranged on the outside of the free end of the supporting bracket 4.

The auxiliary or reenforcing bar 5 is U-shaped and at the base thereof is rigidly fastened to the impact bar 3 at the center thereof by means of a rivet 7 or other fastening means.

The free ends of the U-shaped auxiliary bar 5 are positioned adjacent the free ends of the supporting brackets 4 and on the inside thereof.

Bolts or rivets 10 extending through the longitudinally disposed arm 9, free arm of the U-shaped auxiliary bar 5 and free end of the supporting bracket rigidly fasten the same together. Of course, other fastening means may be employed.

Each supporting bracket 4 has the rear end thereof projecting beyond the end frame bar 2, and this rear end is substantially parallel to the frame side bar 1.

The supporting bracket 4 from a point adjacent the end frame bar 2 extends forwardly and inwardly with its forward end adjacent the frame side bar 1.

The forward end of the supporting bracket 4 is rigidly fastened to the frame side bar 1 by means of a U-bolt 11, a cooperating clamping plate 12 and nuts 13. The U-bolt embraces the frame side bar and supporting bracket, and the supporting bracket is clamped between the side bar and the clamping plate 12.

The supporting bracket is also rigidly fastened to the end frame bar 2 by means of an L-shaped bracket 14.

The L-shaped bracket 14 has a vertical arm 4 rigidly fastened thereto by a rivet 16 or other fastening means.

The other or horizontal arm 17 of the L-shaped bracket fits within the channel of the end frame bar 2 and the supporting bracket 4.

The horizontal arm 17 is positioned under and against the web of the end frame bar 2 on which rests a bracket 18 secured to the automobile body.

The free end of the arm 17 may be provided with a downward extension 17' for assisting in fastening the bracket to the frame end bar.

The horizontal arm 17 of the L-shaped bracket is provided with an opening 19 so disposed that it may be brought into alinement with openings in the frame end bar 2 and body bracket 18, through which extends a bolt 20 for fastening the body to the arm.

Thus the bolt by which the automobile body is fastened to the frame also serves to rigidly fasten the bumper to the end frame bar.

Figure 4 shows a portion of an automobile bumper the impact bar 3 of which is made from a single strip of resilient bar material.

The bumper described herein may be easily and quickly mounted on an automobile frame without mutilating or weakening the frame. The only tool required in mounting the bumper is an ordinary wrench such as may be found in the tool kit carried by most automobiles.

The U bolts and cooperating clamping plates rigidly clamp the supporting brackets to the frame side bars, while the L shaped brackets rigidly fasten the supporting brackets to the frame end bar.

The provision of an opening in the horizontal arm of the L shaped bracket serves when the fastening bolt is in place to prevent displacement of the supporting bar under side thrusts.

Since the L shaped bracket embraces the supporting bracket 4, the supporting bracket may be arranged closely to the automobile frame, thereby obtaining a more rigid structure.

The invention contained herein is, of course, susceptible of other embodiments and adaptations.

The invention claimed is:—

1. A bumper for attachment to an automobile frame having longitudinal side bars and a transverse end bar, comprising a transverse impact bar, a longitudinal supporting bracket secured at one end thereof to the impact bar, an L shaped bracket having one arm thereof rigidly fastened to the longitudinal bracket intermediate the ends thereof and the other arm thereof rigidly fastened to the end frame bar, the longitudinal supporting bracket being curved inwardly from its point of attachment to the L shaped bracket and having its free end abutting one of the longitudinal frame side bars, and means for rigidly fastening the free end of the longitudinal supporting bracket to the longitudinal side bar.

2. A bumper for attachment to an automobile frame having longitudinal side bars and a transverse channelled end bar, the ends of which extend beyond the side bars, comprising longitudinal supporting brackets, each rigidly fastened at one end to one of the frame side bars and curved outwardly from its point of attachment to an extended end of the end frame bar and projecting rearwardly therefrom, an L shaped bracket having one arm positioned within the channel of the end frame bar and rigidly fastened thereto and having a downwardly extending arm positioned outside the longitudinal supporting bracket and rigidly fastened thereto, and a transverse impact bar fastened to the free ends of the longitudinal supporting brackets.

3. A bumper for attachment to an automobile frame having longitudinal side bars and a transverse channelled end bar, whose ends project beyond the side bars, comprising longitudinal supporting brackets, each having an end adjacent one of the frame side bars and projecting outwardly therefrom to the extended end of the end frame and rearwardly therefrom, means for rigidly fastening the end of the longitudinal impact bar to the frame side bar and including a U bolt embracing the supporting bracket and the side bar and a clamping plate abutting the supporting bracket, an L shaped bracket having a horizontal arm positioned within the channelled end frame bar and rigidly fastened thereto and a downwardly extending arm positioned outside the supporting bracket and rigidly fastened thereto, and a transverse impact bar secured to the free ends of the supporting brackets.

4. A bumper for attachment to an automobile frame having longitudinal side bars and a transverse channelled end bar whose ends project beyond the side bars, comprising longitudinal supporting brackets, each having one of its ends positioned alongside one of the side bars and projecting outwardly and rearwardly therefrom to the extended end of the end frame bar and rearwardly therefrom substantially parallel with the side bars, means for rigidly fastening the ends of the supporting bracket to the adjacent side bar and including a U bolt embracing the supporting bracket and side bar and a cooperating clamping plate resting against the supporting bracket whereby the supporting bracket is clamped between the side bar and the clamping plate, L shaped brackets for rigidly fastening the supporting brackets to the end frame bar, each L shaped bracket having a vertical arm outside the supporting bracket and rigidly fastened thereto, and a horizontal arm positioned within the channelled end frame bar and provided with an opening through which fastening means may extend to rigidly fasten the arm to the end frame bar, and a transverse impact bar secured to the free ends of the supporting brackets.

In witness whereof, we have hereunto subscribed our names.

CHARLES H. HATHAWAY.
WILLIAM A. STARCK.